H. KLECKLER.
LANDING GEAR FOR AIRCRAFT.
APPLICATION FILED NOV. 16, 1917.
1,284,907.
Patented Nov. 12, 1918.
2 SHEETS—SHEET 1.
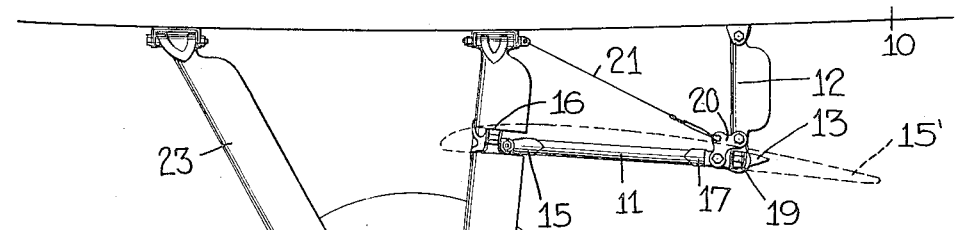
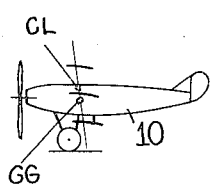
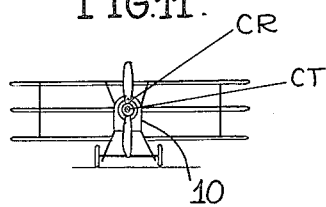
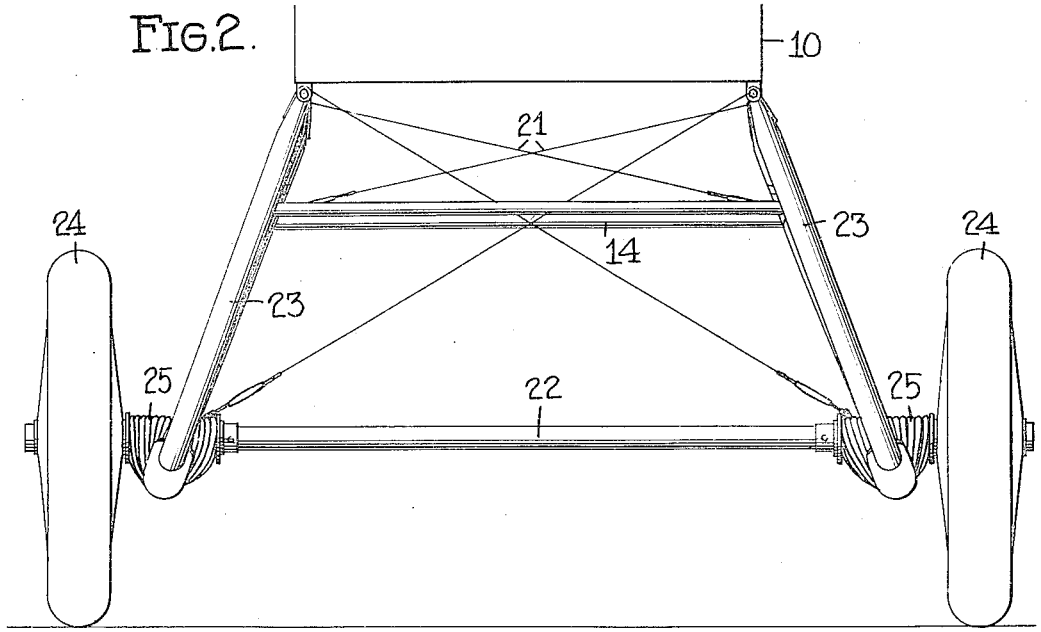
Inventor
HENRY KLECKLER
By
Attorney

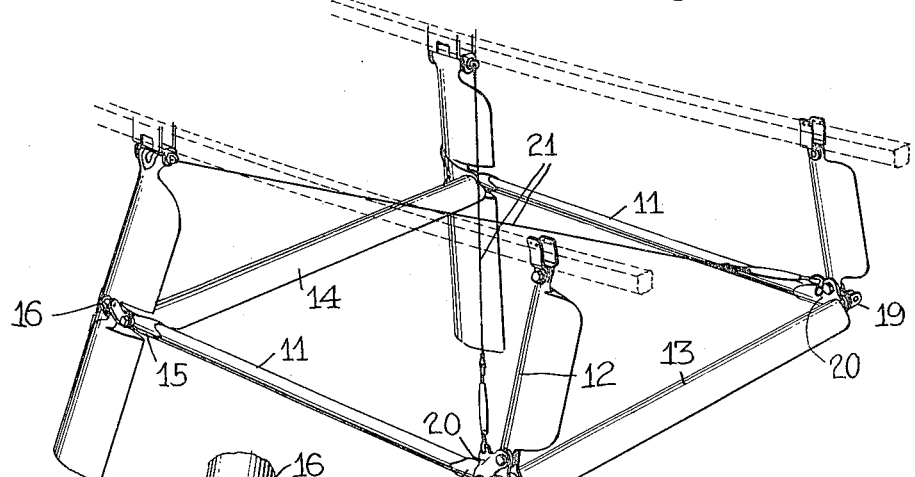

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

LANDING-GEAR FOR AIRCRAFT.

1,284,907.   Specification of Letters Patent.   Patented Nov. 12, 1918.

Application filed November 16, 1917.   Serial No. 202,403.

*To all whom it may concern:*

Be it known that I, HENRY KLECKLER, citizen of the United States, residing at Buffalo, in the county of Erie and State of New York, have invented certain new and useful Improvements in Landing-Gear for Aircraft, of which the following is a specification.

My invention relates to aircraft and more particularly to improvements in landing gear construction.

The characteristic of the invention is the construction of the landing gear in such manner that the lower supporting surface or wings of a triplane or biplane structure may be anchored to the landing gear struts so that the center of resistance and center of thrust will be more nearly longitudinally alined than heretofore. This arrangement of these two centers is especially desirable in aeroplane construction for the reason that immediate response to movements of the various control surfaces is assured. Moreover, provision is made for the arrangement of the wings symmetrically above the center of gravity so that the said center of gravity and center of lift will approximately coincide. The relative arrangement of the landing gear struts with respect to the fore and aft stations of the fuselage has also been considered with a view to proper distribution of both the landing and lift strains throughout the fuselage or body. The details and constructional features of the landing gear will be more particularly hereinafter pointed out.

Of the drawings:

Figure 1 is a vertical longitudinal sectional view of the landing gear.

Fig. 2 is a front end elevation.

Fig. 3 is a perspective view of the landing gear strut and brace arrangement.

Figs. 4, 5, 6 and 7 are elevations of the various details and fittings of the landing gear, and Figs. 8 and 9 are views similar to Fig. 1 illustrating different modifications.

In Fig. 1 the fuselage or body of the craft is designated as 10. Although the stations of the fuselage are not indicated in the drawings the landing gear struts, of which there are four, engage beneath them to symmetrically and uniformly distribute the landing strains longitudinally thereof. As before pointed out it is desirable in aeroplane construction that the center of pressure or lift and the center of gravity should lie in approximately the same vertical plane and the center of thrust and center of resistance approximately coincide. Improper longitudinal balance would result if these various centers were not so relatively arranged. The placement of the landing gear struts relatively to the fuselage must also be considered, and as indicated the struts must be fastened so as to locate the landing gear wheels slightly ahead of the center of gravity. This is especially true in triplane or multiplane construction since the over-all height of the machine cannot be increased beyond certain limits without necessitating an elevation of the fuselage to such an extent as to render entrance and exit impractical. Taking these various factors into consideration it is proposed by the present invention to supplement the conventional V-type landing gear with a structure of such size and proportion that the lower wings can be fastened to it and the various centers properly correlated. This added structure comprises braces 11 extended rearwardly from the rear struts of the opposed V-struts of the landing gear together with vertical struts or braces 12, fastened to the rearward extremities of the braces 11 and to the fuselage 10 respectively. At the points of connection of the braces 11 with the struts 12 the added structure is cross braced as at 13 to form with a cross brace 14 a suitable connection between the wings 15' at opposite sides of the landing gear. These braces collectively take up the compression strains in landing and the tension strains in flight. The struts 12 and the braces 13 and 14 are preferably streamlined as shown.

In the preferred form of the invention the wing hinges are located at the extremities of the braces 13 and 14. The fittings of which the hinges form a part have been detailed in Figs. 4 to 7 inclusive, the forward wing hinges being illustrated in Figs. 4 and 5 and the rear wing hinges in Figs. 6 and 7. The forward hinges or fittings are constructed in socket form as indicated at 15 to receive the forward extremities of the braces 11 and pass around the rear legs of the opposed V-struts to provide at the outside thereof hinge-ears 16 between which the hinge portions carried by the wing beams (not shown) engage. The extremities of the cross brace 14 abut these fittings, interconnect the struts, and interbrace the opposed wing beams of the wings by reason of the alinement provided. The rear fittings are provided with sockets 17 and 18 which receive the braces 11 and struts 12 respectively. The hinge-ears of these fittings are similarly formed to receive between them the corresponding portions of the wing hinges carried by the rear wing beams of the wings. The placement of the cross brace 13 with respect to the rear wing hinges is the same as the placement of the forward cross brace 14 with respect to the wing hinges first described. The rear fittings are equipped with anchorages 20 to which crossed wires 21 are anchored. The wires extend forwardly and upwardly from the rear fittings for connection with the landing gear struts at their points of connection with the fuselage 10. The formation of the rear fittings and the placement of the anchorages 20 is best illustrated in Figs. 6 and 7. In other respects the landing gear is of a more or less standard type in that the axle 22 intersects the landing gear struts, designated as 23, and is provided with landing gear wheels 24 which are mounted upon its extremities. Suitable shock-absorber elastics 25 are used for fastening the axle to the struts.

In the modification illustrated in Fig. 8, the added structure is shown in the form of a brace 26 welded to the landing gear struts and extended at one end rearwardly beyond the landing gear. The wing hinge fittings are mounted upon these braces (two at each side of the fuselage) and may be shifted longitudinally to vary the position of the center of lift. When thus constructed the braces 26 function conjointly as strut-braces for the landing gear.

The modification of Fig. 8 is very much the same as that disclosed of the preferred form in that the wing hinge fittings are similarly placed as regards the longitudinal direction, although adjustable vertically to vary the position of the center of resistance. In this form of landing gear horizontal V-type braces 27 are used instead of the braces 11. The preferred form however, is best where adjustment is unnecessary for the reason that it offers less resistance and may be used in connection with a landing gear in which the landing gear struts take up directly both tension and compression strains.

The nature of this invention is such that a number of modifications can be provided without departing in any-wise from the generic spirit of the invention, i. e., an invention in which provision is made for the anchorage of the lower wings to the landing gear without re-designing it or changing its position relatively to the fuselage and to the center of gravity. Were the structure of this invention omitted the relative arrangement of the various centers could not be effected without shifting the landing gear from its effective position or redesigning and reconstructing the aeroplane in its entirety.

In the diagrammatic illustrations, Figs. 10 and 11, the relative location of the various centers is shown. The center of gravity is designated C.G., the center of resitance, C.R., the center of lift, C.L., and the center of thrust, C.T.

In referring to these centers it is assumed that the machine is of a tractor, single screw type (other types should have the same relative location of centers)—a type in which the propeller is located forwardly of the wing structure and in which the motor is inclosed in the nose end of the fuselage. (The propeller and motor together constitute the propelling power plant). Such an arrangement is more or less conventional, although this, it is believed, is the first attempt made to adapt a triplane wing structure to a standard machine without introducing a distinct type of landing gear or re-designing the machine in its entirety. The frame structure adds nothing whatsoever to its strength or efficiency. Its sole function is to provide a support for the lower supporting surface or wings. The landing gear which is preferably of the conventional V-type acts or rather enters into the framework constituting the wing supporting means. The addition of this framework avoids the necessity of re-designing the machine and further avoids the necessity of shifting the landing gear to an ineffectual position. I am, of course, assuming that the lower supporting surface is indirectly or directly carried by the landing gear struts.

What is claimed is:

1. In an aircraft, a fuselage, a landing gear mounted beneath the fuselage forwardly of the transverse vertical plane of the center of gravity, supporting surfaces, a structure mounted beneath the fuselage rearwardly of the landing gear, and means for fastening one of said supporting surfaces to said structure, the placement of the supporting surfaces being such that the center of lift and the center of gravity lie in substantially the same transverse vertical plane.

2. In an aircraft, a fuselage, a landing gear mounted beneath the fuselage forwardly of the transverse vertical plane of the center of gravity, supporting surfaces, a structure mounted beneath the fuselage rearwardly of the landing gear, means for fastening one of said supporting surfaces to said structure, the placement of the supporting surfaces being such that the center of lift and the center of gravity lie in substantially the same transverse vertical plane, and a propelling power plant so situated that the center of thrust and the center of resistance approximately coincide.

3. In an aircraft, a fuselage, a landing gear mounted beneath the fuselage forwardly of the transverse vertical plane of the center of gravity, a structure mounted upon and projecting rearwardly beyond the landing gear, and means for fastening one of the supporting surfaces to said structure, the placement of the supporting surfaces being such that the center of lift and the center of gravity lie in substantially the same transverse vertical plane.

4. In an aircraft, a fuselage, a landing gear mounted beneath the fuselage forwardly of the transverse vertical plane of the center of gravity, a structure carried conjointly by the landing gear and fuselage to the rear of the former and beneath the latter, and means for fastening one of the supporting surfaces to said structure, the placement of the supporting surfaces being such that the center of lift and the center of gravity lie in substantially the same transverse vertical plane.

5. In an aircraft, a fuselage, a landing gear mounted beneath the fuselage forwardly of the transverse vertical plane of the center of gravity, a propelling power plant, a structure mounted beneath the fuselage to the rear of the landing gear, and means for fastening one of the supporting surfaces to said structure, the placement of the supporting surfaces being such that the center of thrust and the center of resistance approximately coincide.

6. In an aircraft, a fuselage, a landing gear mounted beneath the fuselage, a structure supported conjointly by the fuselage and landing gear, a propelling power plant, and means for fastening one of the supporting surfaces to said structure, the placement of the supporting surfaces being such that the center of thrust and the center of resistance approximately coincide.

7. In an aircraft, a fuselage, a landing gear mounted beneath the fuselage forwardly of the transverse vertical plane of the center of gravity, supporting surfaces, a structure mounted beneath the fuselage to the rear of the landing gear, a propelling power plant, and means for fastening one of said supporting surfaces to said structure, the placement of the supporting surfaces being such that the center of resistance and the center of thrust approximately coincide and the center of lift and the center of gravity lie in substantially the same transverse vertical plane.

8. In an aircraft, the combination with the fuselage and landing gear, of a structure mounted beneath the fuselage to the rear of the landing gear, said structure comprising braces fastened at one end to the landing gear and connected at their opposite ends with the fuselage together with means cross arranged between the extremities of said braces, and supporting surfaces arranged to extend out right and left from said structure, the points of attachment of the supporting surfaces being alined with the respective cross braces.

9. In an aircraft, the combination with the fuselage and landing gear, of a structure mounted beneath the fuselage and to the rear of the landing gear, and airplane wings supported by said structure.

10. In an aircraft, the combination with the fuselage and landing gear, of a structure conjointly supported by the landing gear and fuselage aft of the landing gear, and airplane wings supported by said structure.

11. In an aircraft, the combination with the fuselage and landing gear, of a structure mounted beneath the fuselage and to the rear of the landing gear, opposed airplane wings supported by said structure, and a cross connection between the wings included in said structure.

12. The combination with the fuselage, landing gear and airplane wings of an airplane, of a structure conjointly supported by the fuselage and landing gear for the support of the airplane wings, said structure including a longitudinally extending brace connecting with the landing gear and a substantially vertically extending brace connecting with the fuselage.

13. The combination with the fuselage, landing gear and airplane wings of an airplane, of a structure conjointly supported by the landing gear and fuselage for the support of the airplane wings, said structure including opposed longitudinally extending and opposed vertically extending braces together with a cross brace between the opposed airplane wings.

14. In an airplane, the combination with the fuselage and landing gear, the landing gear being mounted forwardly of the transverse vertical plane of the center of gravity of the machine, of a structure mounted beneath the fuselage and to the rear of the landing gear, and airplane wings supported by said structure, the arrangement of the wings being such that the center of pressure of the wing structure and the center of gravity of the machine lie substantially in the same transverse vertical plane.

In testimony whereof I hereunto affix my signature.

HENRY KLECKLER.